United States Patent [19]

Teass, Jr. et al.

[11] 3,831,083

[45] Aug. 20, 1974

[54] CONDUCTIVITY AND SPECIFIC RESISTANCE MEASURING SYSTEM

[75] Inventors: Horace A. Teass, Jr., Brooklyn, N.Y.; William Reid Smith-Veniz, Darten, Conn.

[73] Assignee: McNab, Incorporated, New York, N.Y.

[22] Filed: Feb. 12, 1973

[21] Appl. No.: 331,996

[52] U.S. Cl............................................. 324/30 R
[51] Int. Cl. ......................................... G01n 27/42
[58] Field of Search............ 324/30 R, 30 B, 62, 65

[56] References Cited
UNITED STATES PATENTS

| | | | |
|---|---|---|---|
| 3,430,129 | 2/1969 | Cardeiro | 324/30 |
| 3,582,767 | 6/1971 | Bram et al. | 324/30 |

*Primary Examiner*—Herman Karl Saalbach
*Assistant Examiner*—Rolf Hille
*Attorney, Agent, or Firm*—Peck & Peck

[57] ABSTRACT

Apparatus for monitoring the conductivity or specific resistance of solutions over a broad range consisting of an electronic circuit including a conductivity cell which is adapted to be immersed in the solution and through which AC current is passed. Through the use of a switching arrangement, the same circuit design is useful to measure both conductivity and specific resistance of solutions. The cell output is fed to an operational differential integrated amplifier which is used to drive the meter and recorder components. The cell output is also compared to a reference voltage by a controller section and, when the cell signal exceeds a predetermined level, warning signals are produced. The unit is capable of generating an alarm signal upon the occurrence of two or more alarm points being exceeded.

10 Claims, 2 Drawing Figures

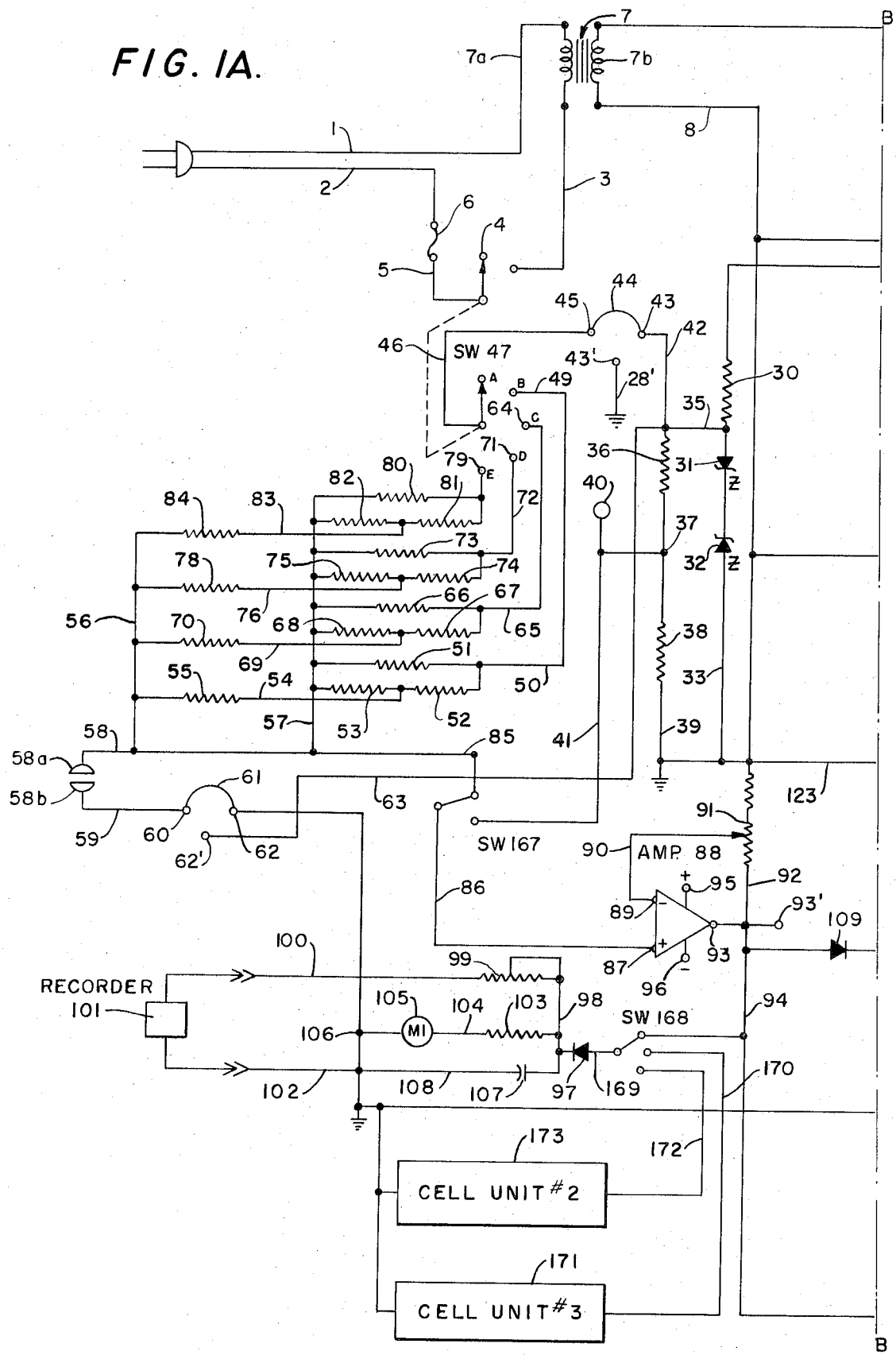
FIG. IA.

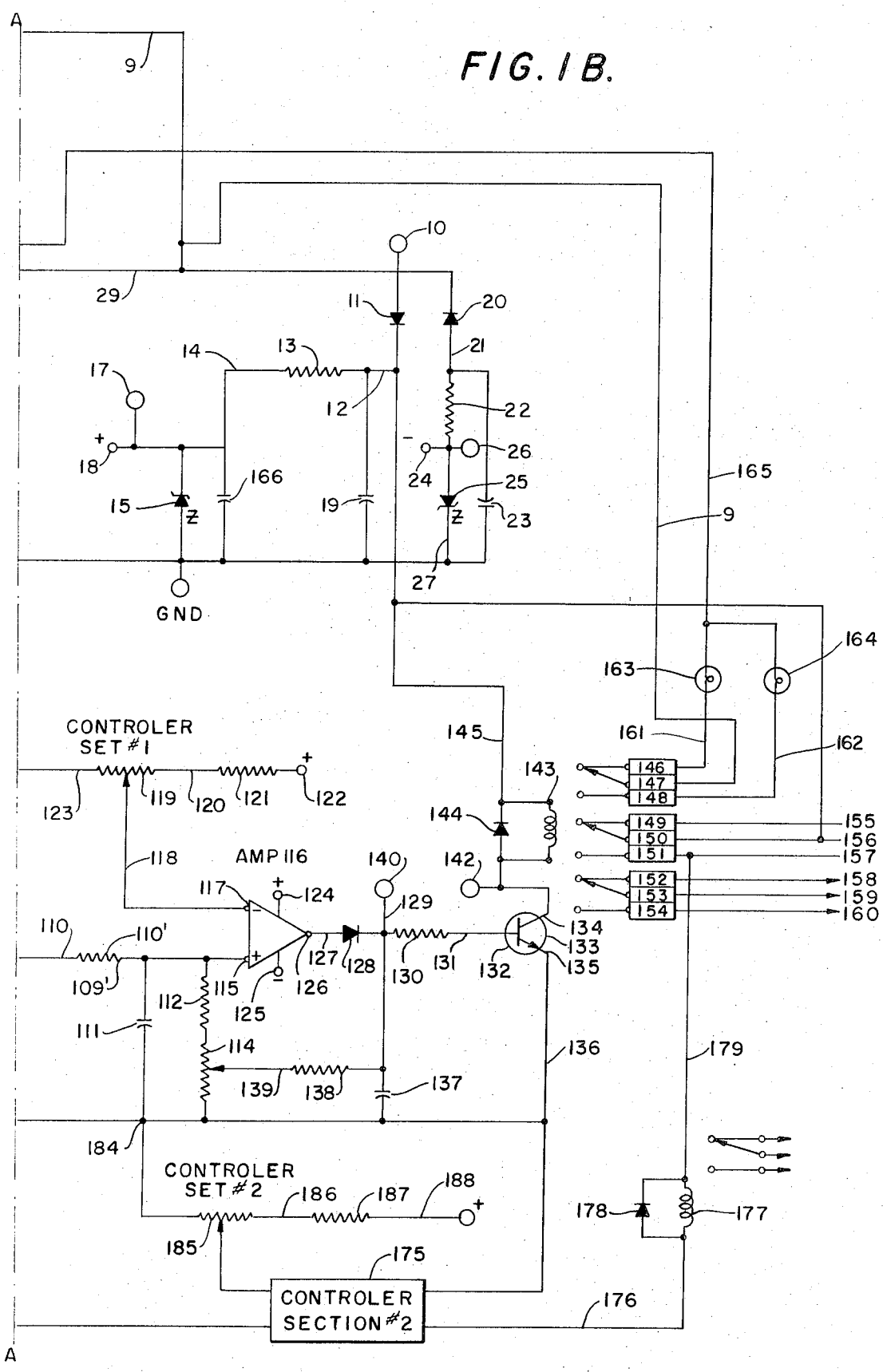

CONDUCTIVITY AND SPECIFIC RESISTANCE MEASURING SYSTEM

BACKGROUND OF THE INVENTION

This invention appertains generally to a conductivity and specific resistance measuring system and is more particularly directed to a system for measuring the conductivity level and specific resistance of an aqueous solution by monitoring variations in ionic concentration of the aqueous solution.

Conductivity measurements of aqueous solutions have been made on a laboratory basis for many years. In general, the conductivity of a solution is measured with the aid of a conductivity cell which is immersed in the solution whose conductivity is to be measured. The conductivity cell consists of a pair of spaced electrodes connected to a source of potential. When the electrodes are placed in a solution, current flows between the electrodes in an amount which is proportional to the concentration of ionizable dissolved solids present in the solution. This current can then be measured to determine the conductivity of the solution and an indication of the impurity or dissolved solids present in the solution.

The conductivity cell in effect functions as a variable resistance, the value of resistance being dependent on the ion concentration of the solution, which in turn is a function of the concentration of ionizable solid material present in the solution as well as the solution temperature. In effect, therefore, conductivity is measured by measuring the specific resistance of the quantity of the solution located in the path between the electrodes. From this resistance, the conductivity of the solution may be determined knowing the cell constant, which is merely a proportionality constant relating the conductivity of a solution to the resistance of a given conductivity cell when immersed in the solution.

In the laboratory, the measurement of conductivity can be made with great accuracy and methods and apparatus for doing so have achieved a high degree of refinement. Unfortunately, the success met in making laboratory conductivity measurements has not, as a practical matter, been duplicated in the area of providing useful conductivity data relative to ship systems, power plants, manufacturing plants, natural water resources such as rivers and lakes and many other installations where it may be desired to determine the presence of objectionable dissolved solids.

To appreciate the problems involved, it is necessary to understand the nature of the conductivity monitoring process. In many applications, for example, it is essential that the ionic concentration of impurities in an aqueous solution be under constant surveillance and that an alarm be activated in the event that certain predetermined concentration limits are exceeded. Some examples of particular applications in which such conductivity monitoring system are essential are water purifying systems and steam generating plants. In water and steam systems, it is essential that ionic concentrations or impurities of even a very low order of magnitude immediately be detected so that remedial steps can be initiated to avoid significant damage to the equipment resulting from such objectionable conditions as contamination of fresh water in condensers through leaks and formation of scale in boiler tubes.

SUMMARY OF THE INVENTION

The present invention is an instrument capable of measuring, with essentially the same circuit, the conductivity or specific resistance of a solution. The unit contains regulated AC and DC power supplies for generating its own regulated power. The DC supply contains a novel circuit for supplying additional DC power when the DC dynamic load requires it. A first differential, operational integrated circuit amplifier receives the output from a conductivity cell and drives the meter and recorder circuits. A second differential, operational integrated circuit amplifier drives the controller section which senses when the cell output exceeds a reference voltage and generates a control signal to actuate a relay and/or signal device. A feedback circuit for the second amplifier prevents noise-like signals from adversely affecting the system. Additional controller sections may be added to the unit so that the unit is capable of generating an alarm signal upon the occurrence of two or more alarm points (cell outputs) being exceeded.

BRIEF DESCRIPTION OF THE DRAWINGS

The drawings are a schematic circuit diagram of a preferred conductivity and specific resistance measuring circuit constructed in accordance with the principles of this invention, and are designated FIG. 1A and FIG. 1B.

DESCRIPTION OF THE PREFERRED EMBODIMENT

In accordance with a preferred embodiment of the invention, the measuring circuit includes a power input section which supplies conventional AC power to the unit. Standard supply power mains from a suitable source (not shown) are connected to conductors 1 and 2. Conductor 1 is connected to the primary winding 7a of a constant voltage isolating transormer 7, then from 7a through conductor 3 through a switch 4 into conductor 5 to a fuse 6 and back to conductor 2. The transformer 7 reduces the power supply voltage to a desirable level and maintains the secondary side voltage at a constant level regardless of normal input variations which may occur in the system. The transformer 7 also functions to isolate the unit from the power supply mains. The switch 4, which is mechanically coupled to the switch 47 (described below), turns the unit power on and off, while blow fuse 6 serves to protect the electrical system and guards against a malfunction becoming serious enough to burn out a component. The power input section functions to deliver a predetermined voltage to the secondary winding 7b of the transformer 7. The secondary winding 7b connects to the conductors 8 and 9, which supply power to the direct current regulated power supply section and to the AC regulated power supply section.

The direct current regulated power supply supplies regulated direct current power to other components of the unit which require a direct current supply. An AC current flows in the conductor 9 and may be checked at the test terminal 10 for proper voltage level. The diode 11 allows only the positive flow of AC current so that only positive voltage appears on the conductor 12. The capacitor 19 functions as a conventional power supply filter capacitor. The positive voltage on the conductor 12 is dropped by the resistor 13 so that a lower positive voltage appears on the conductor 14. The conductor 14, in turn, connects to a zener diode 15, which maintains a steady voltage at a preselected level. That zener voltage may be measured at the test terminal 17. A capacitor 166 is connected across the zener diode 15 and performs a novel function in supplying DC power to the unit. A low level, regulated DC positive voltage is supplied at the terminal 18, and is made available to the rest of the unit for its operation. The dynamic load of the DC regulated power supply is greater than the static or steady state load and the capacitor 166 functions to supply the additional DC power required by the unit under the dynamic or heavy load conditions. If it were not for the capacitor 166, the wattage of the resistor 13 and the wattage of the zener diode 15 would have to be considerably increased; however, by virtue of the present novel design, the capacitor 166 supplies the additional power required in the dynamic load of the system.

Returning to the conductor 9 for the description of the negative section of the regulated DC power supply section, the conductor 9 connects to a diode 20, which allows only the negative AC current cycles to pass and to thereby appear on the conductor 21. The resistor 22 drops that negative voltage and the zener diode 25 provides a steady negative voltage at a preselected level. The zener diode 25 connects to the conductor 27, which, in turn, connects to circuit common or ground GND. The capacitor 23 functions as a filter capacitor; it connects to the conductor 21 and provides the smoothing effect of a filter capacitor. The negative, regulated DC voltage can be measured at the test point 26, while the regulated negative voltage is available to the rest of the unit through the terminal 24. Thus, it is readily apparent that the DC regulated power supply provides regulated positive and negative voltages and a common or ground for the unit's operation.

The regulated AC power supply section provides the unit with a regulated AC voltage that is independent of power source variations. An AC current is conducted from the conductor 9 to the conductor 29 where it is dropped by the resistor 30 and appears as a reduced AC voltage at the conductor 35. The conductor 35 is connected to a zener diode 31, which functions to permit current to pass in one direction fully but blocks the current attempting to pass in the opposite direction up to a predetermined voltage level (its zener voltage). The zener diode 31 is connected in a back-to-back relation with another zener diode 32, which, in turn, is connected to common or ground through the conductor 33. The zener diode 32 operates in the same manner as the zener diode 31 but in the opposite sense, such that zener diodes 31 and 32 function together to provide a regulated AC voltage, which is available at the conductor 35 to the rest of the unit.

A novel circuit permits this unit to function either as a conductivity instrument or as a specific resistance instrument. The conductor 35, which conducts the unit's regulated AC current, is connected to the conductor 42 which, in turn, connects to the junction 43 where a jumper wire or switch 44 normally connects junction 43 to the junction 45. The junction 45 is connected by the conductor 46 to the pole of the switch 47. In conjunction with the foregoing, and simultaneously with it, the jumper wire 61 normally conducts the AC circuit current from the cell 58 to the junction 62, which is connected to ground. The schematic diagram, as shown, illustrates one mode of operation of this invention whereby an increase in the resistance measured will result in an increase in the meter reading. If it is desired to change the mode of operation of the unit, the jumper wire 44 can be moved from the junction 43 to the junction 43' and thereby grounded through the conductor 28'; this action will cause the pole of the switch 47 also to be grounded. Furthermore, the jumper wire 61 is moved from the junction 62 to the junction 62' which connects through the conductor 63 to the regulated AC supply at the conductor 35. When these two jumper changes are made, the unit will function to measure conductivity so that as the conductance increases, the meter reading will increase. Thus, this novel circuitry, gives the user the option of two fundamentally different types of instruments while essentially using the same schematic or printed circuit board. Of course, the change of mode may necessitate an adjustment in the meter calibration and nomenclature to correspond to the new instrument function.

In the operational mode illustrated in the schematic, the regulated AC voltage appears at the pole of the switch 47, which has positions A (disconnected), B, C, D and E. By virtue of the switch 47, the operator may select different resistance or conductivity ranges, or may select different thermistor networks to compensate for the fact that the conductivity of a solution is a function of its temperature. For example, if the operator selected the thermistor network 49 or the position or range B, the regulated AC current would be conducted through the conductor 50, through the network comprising the resistors 51, 52, 53 and the thermistor 55. Resistors 51, 52 and 53 and the thermistor 55 are chosen to accommodate the characteristics of the particular aquas solution to be monitored and the methods for selecting the values of these elements are well known to those versed in the field of conductivity measurements. However, it must be understood that the actual values of the thermistor and network resistances will depend upon the particular aquas solution under consideration and the values given here are for illustrative purposes only. Likewise, the operator may wish to select the switch 47 pole positions C, D or E and thereby utilize the resistor-thermistor networks 64, 71 and 79, respectively. Thus, the operator can select on this single unit, one of many positions of range and/or temperature and range adjustment. This permits the unit to be used in measurements involving many different grades of aquas solutions as well as for the system range scaling.

The conductivity cell 58 functions as the transducer for the unit. The regulated AC current, after flowing through the preselected thermistor network, is passed by the conductor 56 to the conductivity cell 58. The cell 58 is normally emersed in the aquas solution to be monitored so that the AC current passes through the cell 58 and that part of the solution between the electrodes 58a and 58b of the cell 58. From the cell electrode 58b, the AC current then passes through the conductor 59 and the jumper wire 61 to ground. The operation of the conductivity cell 58 is described above.

It is well understood in the art of conductivity measurements that the resistance of a fluid such as water will vary with the magnitude of concentration of ionizable dissolved solids present in the solution. The resistance characteristics of the solution also will be affected by its temperature, the resistance varying inversely with the temperature. Since a system such as is herein disclosed must be unaffected by variations in the fluid temperature, it is essential that the sensing element, in this case the conductivity cell, be compensated for variations due to temperature change in order that the output thereof be a true indication of the ionic concentration of the solution. In order to provide this compensation, the thermistors are included in the circuit with the conductivity cell 58. Moreover, to insure that the conductivity cell electrodes 58a and 58b and the thermistors are simultaneously subjected to the temperature of the solution under test, the cell 58 and the thermistor networks are in close proximity to one another in a probe unit (not shown).

The measuring system includes a recalibration and check switch which functions to permit basic calibration of the system and, thereafter, operator verification of the system's calibration. The regulated AC voltage appearing at the conductor 35 is dropped through the resistor 36 and appears at the junction 37, which connects through the resistor 38 and conductor 39 to ground. Thus, at the junction 37, a regulated, predetermined AC voltage is available. This AC voltage can be checked at test junction 40. The regulated AC voltage appearing at the junction 37, passes through the conductor 41 to the pole of the switch 167. The adjusted, regulated AC voltage appears on the conductor 85 at the opposite pole of the switch 167. Normally the switch 167 connects the conductor 85 to the conductor 86; however, for operator verification of the unit's operation and calibration, the operator can depress the switch 167 and cause the conductor 85 to be directly connected to the conductor 41. This action, in effect, removes the cell 58 and the thermistor networks from the measuring circuit and introduces the predetermined voltage to the unit. The meter can then be read to obtain a check on the calibration and circuit operation of the unit.

An isolating amplifier functions electrically to isolate the cell thermistor section from the display-control section. The adjusted regulated AC current coming from the cell 58 passes through the conductor 85, the switch 167, the conductor 86 to the non-inverting terminal 87 of a differential operational integrated circuit amplifier 88. The inverting input terminal 89 is directly connected through the conductor 90 to the arm of the potentiometer 91, through part of the resistance of the potentiometer 91, through the conductor 92, and thence to the output terminal 93. Test junction 93' is provided to allow the output of the amplifier 88 to be measured. The purpose of this operational amplifier is to provide a very high degree of isolation between the probe and the display and control functions of the system. It has a very high input resistance at the junction 87 so that it does not load down the cell 58 or adversely affect, for example, the thermistors or the resistor networks used in conjunction with those thermistors. Moreover, it delivers, when required, the power to operate the display and control circuits as described below. The voltage gain of the amplifier 88 is variable through movement of the potentiometer arm 91. This simple and direct amplifier system is novel to this type of instrumentation. The amplifier 88 output at the terminal 93 is fed through the conductor 92 to the potentiometer 91. The positive DC power voltage produced at the terminal 18 is fed to the amplifier 88 at the input terminal 95 and the negative DC power voltage produced at the terminal 24 is fed to the amplifier 88 at the input terminal 96.

The circuit design of the present invention provides a novel unified circuit calibration technique. As described above, the output of the amplifier 88, which appears at the terminal 93, is fed to the potentiometer 91, and the movable arm 90 of the potentiometer 91 is connected directly to the inverting input 89 of the amplifier 88. By adjusting the potentiometer arm 90, the feedback ratio, and thus the gain, of the amplifier 88 is changed. The basic calibration of the unit for both its display as well as its control functions can be set by moving the arm 90 of the potentiometer 91 and selecting the precise voltage required to calibrate the display, which is normally a meter, and the controller, which is described below. Furthermore, movement of the potentiometer 91 arm provides an additional touchup to bring the instrument into precise recalibration. Thus, the purpose is to have both the meter and the control amplifier track with each other, thus having an instrument where the meter and the controller read the same, and yet have an easy calibration of the whole system.

The function of the meter section of the unit is to permit constant readings of the conductivity or resistance of the aquas solution. The AC current output from the amplifier 88 passes through the switch 168, the conductor 169 and the diode 97. Since the diode 97 allows current flow in but one directions, the conductor 98 has a positive DC pulsing voltage thereon. This DC pulsing current is smoothed by a capacitor 107, which is grounded through the conductor 108. Connected to the conductor 98 is a resistor 103 which drops the voltage on the conductor 98 before feeding it through the conductor 104 to the meter 105, which, in turn, is grounded at the junction 106. This circuit provides for the continuous monitoring by the meter 105 of the output from the amplifier 88.

It should be noted that although the switch 168 is illustrated as being connected to the conductor 94, it is possible to connect the switch 168 to the conductors 170 or 172 or any number of other poles that might be added. When the switch 168 is connected to the conductor 170, the meter section is then set to continuously measure the output from the cell unit 173, which, like the cell 58 and its associated circuitry previously described, contains all of the components to measure the resistance or conductivity of a solution and produce an electrical signal indicative of that measurement. It should be understood that the instant invention is not limited to the use of any set number of conductivity cells. Each of the cells is provided with an associated monitoring circuit network. Since the circuit networks associated with each of the cells are similar to each other, the description of said circuits will be limited to the cell 58, it being understood that the description of the arrangement and function of the circuit components is equally applicable to the remaining cells. It will also be understood that the number of cells may be varied in accordance with the requirements of a particular application and that it is a feature of this invention that said variations may be readily and efficiently accomplished.

The unit has an additional output section which functions to permit an additional display function of the conductivity or resistance of the aquas solution. As described above in conjunction with the description of the meter circuitry, the conductor 98 conducts a DC pulsing voltage. The potentiometer 99 connects the conductor 98 to, for example, a zero to one milliamp recorder 101, which is connected through the conductor 102 to ground. The potentiometer 99 drops the voltage of the system down to make it appropriate for the zero to one milliammeter; the potentiometer 99 also forms a calibration for the recorder unit. As was noted with respect to the meter 105 circuit, the recorder 101 could be switched from monitoring the cell 58 to monitoring other cells such as 171 and 173.

The diode 109 performs the functions of rectifying the output from the amplifier 88 and isolating the meter and recorder circuits from the possible excessive positive voltages which may appear on the conductor 110. The AC voltage appearing on the conductor 92 is applied to the diode 109. This diode 109 is so placed in the circuit such that when the voltage on the conductor 92 is more positive than the voltage on the conductor 110, a current will flow in the diode 109 to equalize the two voltages. However, for reasons which will be made more apparent below, the conductor 110 may, under certain circumstances, have a greater positive voltage than the conductor 92, and, in that case, the diode 109 prevents any back current flow through the conductor from obstructing the readings on the meter 105 and the recorder 101.

The differential, operational, integrated circuit amplifier 116 enables the operator to select the level at which the alarm will be activated. The diode 109 permits only a positive voltage to appear on the conductor 110'; this positive voltage is smoothed by the capacitor 111 and the resistor 109'. The resistor 112 and the potentiometer 114 connect the conductor 110' to ground. The capacitor 111 along with the resistor 112 and the potentiometer 114 form a stable RC integrating network of an essentially constant value. The voltage appearing on the conductor 110' is applied to the noninverting input 115 of the amplifier 116. The inverting input terminal 117 is connected to the conductor 118 which is attached to the movable arm of the potentiometer 119. One side of the potentiometer is grounded through the conductor 123, while the other end of the potentiometer 119 is connected through the conductor 120 and the resistor 121 to the terminal 122, which, in turn, is connected to the positive DC regulated supply available at the terminal 18. The terminal 124 of the amplifier 116 is connected to the positive DC voltage available at the conductor 18; the terminal 125 of the amplifier 116 is connected to the negative DC voltage available at the terminal 24. The output terminal 126 of the amplifier 116 is connected through the conductor 127 to the diode 128, which, in turn, is connected to the conductor 129. The output from the amplifier 116 may be measured at the test junction 140. The conductor 129 is connected through the resistor 130 to the conductor 131. The diode 128 is also connnected through the conductor 129 to the capacitor 137 which, in turn, is connected to ground. The resistor 138 connects the junction of the conductor 129 and the capacitor 137 to the conductor 139 and the movable arm of the potentiometer 114. The proper action of this circuit is obtained by using both of the inputs 115 and 117 of the amplifier 116. The two input voltages are both DC and both positive, one being derived from the DC regulated power supply through the potentiometer 119 and the other being derived from the amplifier 88 through the diode 109. For convenience in this discussion, the input voltage applied to the terminal 115 is designated V$s$, while the input voltage applied to the terminal 117 is designated V$r$. Because of the nature of the circuit and the operational amplifier 116, with its high gain, if V$r$ is more positive than V$s$, the output on the terminal 126 will be as negative as the circuit allows, and thus, the output through the diode 128 will be zero volts. However, when the voltage V$r$ is slightly less than the voltage V$s$, the output on the terminal 126 is as far positive as the circuit allows, and the diode 128 conducts so that the conductor 129 is as far positive as it can be. Thus, when the reference voltage V$r$ has been exceeded by the signal voltage V$s$, the output of the diode 128 goes from zero volts to positive volts. The trigger or set point at which the output of the operational amplifier 116 goes positive, may be set by the operator by rotating the arm of the potentiometer 119. The operator can vary the voltage V$r$ from zero volts to full voltage; also, V$r$ can be selected to be greater than V$s$ under any condition. The output of the amplifier 116, which feeds through the diode 128, may be connected to a relay, SCR, triac or, as in the diagram, a transistor 133 which, in turn, drives a relay 143, such that the relay will be activated at any time that the voltage V$s$ exceeds the reference voltage V$r$. Thus the operator can set the controller at a predetermined level so that when the condition described above occurs, the set point (alarm level) is exceeded and the alarm is activated. It should be understood that the unit can be made to have a negative on position by the positive on condition as is illustrated in the schematic.

The unit employs a novel variable hysteresis circuit which functions to permit the amplifier 116 to hold positively after V$s$ becomes greater than V$r$ without disturbing the set point level. Once the amplifier 116 senses the appropriate voltage condition and its output goes to positive, it should stay in the positive state unless the voltage V$s$ falls somewhat below the voltage V$r$. This is for the user's convenience. If it was otherwise, the unit's operation is so accurate that noise signals or other small unwanted signals would cause "on and off" conditions. Further, it is desirable to have these levels variable to suit the operator's particular problems. This adjustment changes the spread between pull in and drop out. This difference is called hysteresis. Therefore, the following variable hysteresis circuit is included in the unit.

The positive voltage appearing on the conductor 129 is fed to the resistor 138, through the conductor 139 to the potentiometer 114, through the resistor 112 to the non-inverting input terminal 115. Thus, when the amplifier 116 senses that V$s$ is greater than V$r$, a variable positive voltage may be fed back to the input and appears as a very small voltage increase on the terminal 115. Call this new voltage V$h$. V$h$ is sufficiently large, however, to keep the amplifier 116 in the positive state even if V$s$ should slightly decrease below V$r$ in that the sum of V$s$ plus V$h$ is still greater than V$r$. Note — the circuit is arranged so as to allow only a positive feed back voltage to appear on the terminal 115 (because of diode 128 use) — to allow a negative voltage to appear on the terminal 115 would adversely affect the set points of the amplifier 116 for accuracy and repeatability because varying of the hysteresis contact would add (+) or subtract (−) V$h$ from V$s$, causing in effect a variable trigger level. This circuit is arranged so that a variable amount of just positive voltage can be fed back to the terminal 115. This permits a variable level of dropout to be obtained but with a constant level of trigger or pull in. This allows the operator to vary the system's control (hys) independently of the trigger point (set point).

Further, the novel design of the circuit is such that the time constant of the RC combination of the capacitor 111, the potentiometer 114 and the resistor 112 is not noticeably changed by changes in the level of positive feed back voltage so that the operating time of the amplifier 116 remains relatively constant. Thus, the objectives of the amplifier are met. It is fast and positive acting; it acts completely across the voltage range of Vs and, when it fires, it remains in that condition until the predetermined feed back voltage is overcome and then it returns to the zero output condition, this being done without disturbing the basic timing or set point of the circuit.

This circuit also functions where the polarities are shifted from + to −, and − to + where the feedback is introduced into the reference voltage side of the circuit depending on output needs and circuit operation requirements.

The integrating circuit comprising the capacitor 137 and the resistor 130 is used to minimize the possibility of relay chatter. It holds the unit in a stable positive condition both through the positive feedback path of the resistor 138 and through supplying current through the resistor 130. This novel circuit holds the unit in a positive condition by having a voltage remain on the capacitor 137 and thereby supplying current to the terminal 115 and to the conductor 131 for a greater time than these components would be supplied without this circuit. This means that a momentary unwanted change in Vs or Vr and then a fast recovery does not artificially trigger the unit to change states. Thus, for example, when the relay is in the energized position and a momentary transcient decrease comes in through Vs, such that it would normally overcome the protection of the positive feedback voltage, this circuit holds the output constant and therefore the relay in the energized state until the transcient has passed and the original Vs is restored. It should be noted that the design of the unit facilitates the actuation of the relay while it inherently guards against relay dropout.

The unit employs a transistorized relay amplifier to convert a low level DC voltage to drive a relay which, in turn, can drive other circuits. The output of the amplifier 116 is fed to the base 132 of the transistor 133. The transistor emitter 135 is connected through the conductor 136 to ground, while the transistor collector 134 is connected to the relay 143. The diode 144 is connected across the relay 143. The relay 143 and the diode 144 are connected through the conductor 145 to the conductor 12 of the power supply. The output of the amplifier 116 is either zero or plus voltage so that no current or a small amount of current is fed to the base 132 of the transistor 133. When no current is being fed to the base 132, the transistor 133 is not conducting and no current flows through the circuit comprising the relay 143 and the transistor 133. However, when the conductor 131 becomes slightly positive, a small current flows into the transistor base 132, causing the transistor 133 to conduct so that a current flow through the relay 143 energizing it. The diode 144 protects the transistor 132 from the collapsing of the field of the relay 143. The poles of the relay 143 may be connected to various indicating devices. For example, the connections 146, 147 and 148 connect to a system of indicator lights 163 and 164. Current from the conductor 9 feeds through the relay contacts through the conductor 161 through light 163 to the conductor 165 and back to the conductor 8. However, when the relay is put into the energized state, the conductor 147 is connected to the conductor 148 through the conductor 162, the light 164 through the conductor 165 and back to the conductor 8. When the relay is in a non-energized state, the light 163 is normally out and the light 164 is normally on. It can readily be seen that other lamps can be driven by the different contacts of the relay such as 149, 150 and 151 and 152, 153 and 154. Additionally, the relay 143 may be used to drive other lamps, whistles, bells, solenoids, motors, etc., so that the operator will be instantaneously notified when the predetermined level has been exceeded.

The present unit is also capable of providing two or more alarm points. For example, the operator may want to be first notified of a high conductivity level and then, at even a higher level, the controller will actually operate a solenoid valve. Furthermore, the operator might want the additional requirement that the second level can never be set lower than the first level. There follows a description of a new and unique method for accomplishing this. The output from the amplifiers 88 is fed through the conductors 92 and 94 to the input of the controller section 175. The controller section 175 is defined to comprise components similar in design and function to those of the controller section whose amplifier is 116. These similar components are: diodes 109 and 128, resistors 109′, 112, 114, 138, and 130, capacitors 111 and 137 and transistor 133. It is understood that the controller section 175 performs a like function as the controller section whose amplifier is 116.

It is to be specifically noted, however, that the controller section 175 does not have the relay power supplied to it until the relay 143 is energized. In this way, the output of the relay 177 will not change a state until at least the relay 143 has been activated. The relay 143, of course, will not be activated until the voltage Vs exceeds the voltage Vr at the input to the amplifier 116. Should power be available at the relay 177, no current will pass through the conductors 176 and 179 until there is a complete circuit through the controller section 176. This circuit completion can be accomplished only if the controller section 175 level Vr has been exceeded by the voltage Vs. The reference voltage Vr for the controller section 175 is established by the positive voltage on the conductor 188 which is dropped down through the resistor 187, passes through the conductor 186 and through the movable arm of the potentiometer 185. The opposite end of the potentiometer is grounded through the conductor 185. Thus, before the relay 177 can be activated, two conditions must be met: the relay 143 must be activated, and the voltage Vs must be greater than the voltage Vr for the controller section 175. The operational level of the controller section 175 can be varied across its entire range by changing the arm position of the potentiometer 185.

The embodiment of the invention illustrated and described herein has been selected for the purpose of clearly setting forth the principles involved. It will be apparent, however, that the present invention is susceptible to being modified in respect to details of construction, combination and arrangement of parts which may be resorted to without departure from the spirit and scope of the invention as claimed.

What is claimed is:

1. An electric system for monitoring the conductivity of a liquid, said system comprising:
    a. an electrical circuit for generating a regulated DC voltage;
    b. an electrical circuit for generating a regulated AC voltage;
    c. a conductivity cell in contact with said liquid, said cell being connected to said AC source;
    d. a temperature responsive network in series circuit with said cell and in thermal proximity to said liquid;
    e. an indicating circuit for indicating the peak value of any current flow through said cell;
    f. a first amplifier connected to receive any current output from said cell and to drive said indicating circuit;
    g. a second amplifier adapted to receive a positive DC output from said first amplifier as one input thereto, to receive a negative reference DC input derived from said regulated DC voltage as a second input thereto, and producing an output signal; and,
    h. a variable hysteresis circuit, including said second amplifier having input terminals, means in said circuit for maintaining the amplifier in the positive state when the amplifier senses that the input on one terminal is more positive than on the other, whereby a change of hysteresis does not change the trigger point of the unit.

2. The system according to claim 1 wherein said regulated DC voltage generating circuit includes a zener diode and a capacitor connected in parallel with an output terminal thereof, whereby said capacitor functions to provide additional DC power when the dynamic load requires it.

3. The system according to claim 1 wherein the circuit including said conductivity cell, said thermal network and said AC regulated source further comprises first and second switches, each having first and second states, whereby when said switches are in said first state said indicating circuit will indicate the conductivity of said liquid and when said switches are in said second state said indicating circuit will indicate the specific resistance of said liquid.

4. The system according to claim 1 wherein said indicating circuit comprises a meter and a recorder.

5. The system according to claim 1 wherein said first and second amplifiers comprise differential, operational integrated circuit amplifiers and a diode is positioned between the output of said first amplifier and an input of said second amplifier.

6. The system according to claim 1 further comprising an RC integrating network connected in circuit between said first amplifier output and said second amplifier input.

7. The system according to claim 1 further comprising a closed positive feedback loop connecting said second amplifier output to said second amplifier input.

8. The system according to claim 7 further comprising a transistor adapted to receive and be turned on by an output from said second amplifier and a relay adapted to be actuated by conductance of said transistor.

9. The system of claim 8 further comprising a second RC integrating network connected between said second amplifier output and said transistor whereby said second RC network supplies said closed positive feedback loop and said transistor input.

10. The system according to claim 1 further comprising means adapted to receive said first amplifier output for generating a control output signal when said second amplifier produces an output.

* * * * *